Oct. 31, 1944.     O. ROELEN     2,361,709
APPARATUS FOR FORMING THREADS OR FILAMENTS FROM
MIXTURES OF SOLID AND LIQUID MATTER
Filed Sept. 17, 1938

Inventor
Otto Roelen
by Michail Michailin
atty.

Patented Oct. 31, 1944

2,361,709

UNITED STATES PATENT OFFICE 2,361,709

APPARATUS FOR FORMING THREADS OR FILAMENTS FROM MIXTURES OF SOLID AND LIQUID MATTER

Otto Roelen, Oberhausen-Holten, Germany; vested in the Alien Property Custodian

Application September 17, 1938, Serial No. 230,512
In Germany September 29, 1937

5 Claims. (Cl. 18—8)

This invention relates to the treatment of mixtures of solid and liquid matter for the purpose of molding such mixtures to form thin filaments or threads. It is particularly concerned with the molding of masses containing solid matter, for instance a precipitate, suspended in water, such as the mixtures of inorganic compounds with a carrier substance used in the preparation of catalysts.

Thus for instance catalysts adapted for use in the synthetic production of benzines from carbon monoxide and hydrogen are prepared by precipitating metal salt solutions, for instance a solution of cobalt nitrate and thorium nitrate with an alkali metal carbonate in the presence of kieselguhr. After the alkaline liquor has been separated by filtration, the solid matter still contains 70–80% water. In spite of this high water content the filter cake has a great consistency and it is impossible to mold it into thin filaments, for instance of 1–3 mms. diameter, with the aid of the methods hitherto used for this purpose.

As is well known to those skilled in the art, masses, which could be kneaded, have been molded into filaments or threads by means of hydraulic presses, in which the mass is extruded by means of a piston through the perforated press bottom. Instead of a press operated with a piston also a worm or gear press has been used for this purpose. I have found that it is very difficult to mold, by one of the methods described above, masses which in spite of a comparatively high content of liquid lack a paste-like consistency. Such masses cannot be extruded from a piston-, gear- or worm-press, since under the influence of the pressure the mass is decomposed, the liquid escaping through the perforations, while the solid matter remains on the perforated bottom and soon clogs the perforations.

I have now found that it is possible to extrude also such masses containing a high percentage of liquid with the aid of the types of presses mentioned above and to form them into thin filaments or threads, for instance of 1–3 mms. diameter, provided that the mass, before being forced through the perforations, is subjected to a slight mechanical treatment whereby the mass, which in spite of its high liquid content possesses a high degree of coherence and stiffness, is reduced to the consistenecy of a paste. I have found that in this state the mass can easily be extruded through the perforations and formed into thin filaments or threads.

It is essential that the mechanical treatment of the mass be carried through to a predetermined extent only, for if the treatment of the mass is conducted beyond a certain point, the mass becomes thinly fluid and then drips through the perforated bottom without forming coherent threads or filaments. On the other hand, if the mechanical treatment is insufficient, the mass separates into water and solid matter and the narrow perforations are clogged.

The extent of mechanical treatment of the mass depends on the kind of material to be treated and can easily be ascertained by tests, it being merely essential that the mechanical treatment reduce the mass to a pastelike or doughy consistency.

In the drawing affixed to this specification and forming part thereof several embodiments of a device, in which such masses can be subjected to the mechanical treatment enabling them to be molded into filaments or threads, are illustrated diagrammatically by way of example.

Figure 1:
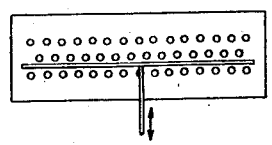
Fig. 1 is a diagrammatic showing of the perforated bottom of an extruding press in combination with means for treating the mass covering this bottom.
Figure 2:
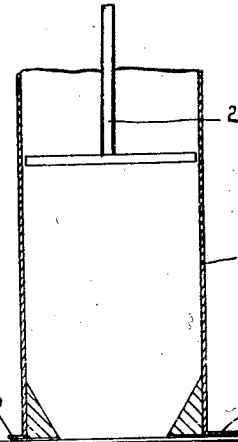
Fig. 2 is a diagrammatic sectional view of a press fitted with a perforated bottom such as shown in Fig. 1.
Figure 3:
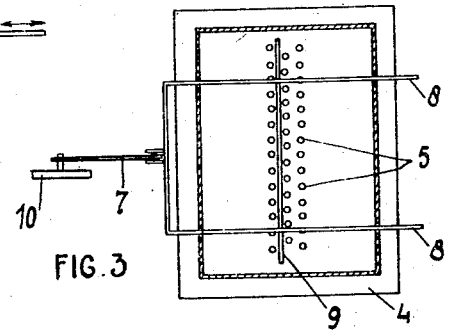
Fig. 3 is a plan view of this bottom and the mechanism for treating the mass deposited thereon.

Referring to the drawing and first to Figs. 1–3, 1 is the vertical rectangular container of a press and 2 is a piston vertically reciprocable in this container, 3, 3 are inserts of triangular section resting on the substantially plane bottom 4 and covering the unperforated parts of the bottom, leaving only the middle section uncovered, which is formed with some parallel rows of perforations 5. 6, 6 are horizontal stuffing boxes extending across the wall of the container 1 and the inserts 3, and 7 is a connecting rod governing the reciprocating movements of a pair of parallel rods 8 extending through the stuffing boxes 6 and carrying a rod 9, which is arranged slightly spaced from the perforated bottom 4, extending in parallel to the rows of perforations 5. 10 is an eccentric disc governing the movements of the rods 7 and 8, which is driven by means of a belt 11 from a shaft 12.

The mass to be molded into thin threads or filaments, for instance a mixture consisting of 5–10% metal carbonate, 10–15% kieselguhr and 80% water, which fills the container 1, is forced by the piston 2 with a pressure of 0.1–0.2 kg/cm.$^2$ into the bottom part of the container. The rod 9 being reciprocated across the rows of perforations 5 at the rate of about 70 strokes per minute effects a kneading treatment of the mass, whereby this mass is reduced to a kind of paste, which is then forced by the slight pressure exerted upon it and by the aaction of the reciprocating rod 9 through the perforations 5, issuing under the form of thin filaments, which, on being dried and comminuted, form small uniform pencils.

In contrast to the known extruding pressures a device such as here described enables great quantities of such a mass to be molded into filaments at the rate of 0.2–1 m. per second.

In view of the far reaching subdivision of the mass into thin filaments or threads the efficiency of the catalyst is greatly increased owing to its large surface action. This subdivision of the mass into threadlike skeans offers the further advantage that the mass need not be comminuted after the drying, since the thin threads on dropping onto a table break up into small pieces.

Figure 4:
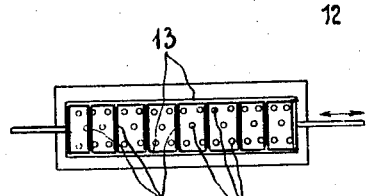
Figs. 4, 5 and 6 are diagrammatic views of perforated press bottoms in combination with modified forms of the mechanical means for reducing the mass deposited on these bottoms to a paste.

Instead of a straight rod such as 9 a grid structure such as shown in Fig. 4 may be used. Here a grid formed of two parallel bars 13 and cross bars 14 is designed to be reciprocated in the longitudinal direction of the rows of perforations 5.

Figure 5:
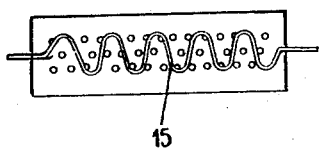
Figure 6:
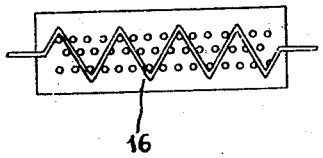

Fig. 5 illustrates the use of an undulated distributing device 15. In Fig. 6 the reciprocatory distributing device 16 has zig-zag shape.

Various changes may be made in the details disclosed in the foregoing specification without departing from the invention or sacrificing the advantages thereof.

I claim:

1. Apparatus for forming threads, filaments, and the like from a mixture of solid and liquid matter comprising in combination, a container for said mixture, said container having a perforated substantially plane bottom therein, means for normally applying pressure to the top surface of said mixture to force the mixture through said perforations and out of the container, an elongated member slightly spaced above said bottom, said member being constructed and arranged to reciprocate in a straight line across substantially all of the perforations in said bottom, and means for reciprocating said elongated member transversely of the longitudinal axis thereof and in a plane substantially parallel to said bottom, whereby to knead said mixture into a mass having a pasty consistency at the points where said mixture is forced from the container.

2. Apparatus for forming threads, filaments, and the like from a mixture of solid and liquid matter comprising in combination, a container for said mixture, said container having a perforated bottom therein, means for normally applying pressure to the top surface of said mixture to force the mixture through said perforations and out of the container, an elongated member slightly spaced above said bottom, said member being constructed and arranged to reciprocate in a plane parallel to said bottom and across substantially all of the perforations in said bottom, and means for reciprocating said elongated member transversely of the longitudinal axis thereof and in said plane, whereby to knead said mixture into a mass having a pasty consistency at the points where said mixture is forced from the container.

3. Apparatus for forming threads, filaments, and the like from a mixture of solid and liquid matter comprising in combination, a container for said mixture, said container having a perforated substantially plane bottom therein, means for normally applying pressure to the top surface of said mixture to force the mixture through said perforations and out of the container, an elongated undulated member slightly spaced above said bottom, said member being constructed and arranged to reciprocate in a straight line across substantially all of the perforations in said bottom, and means for reciprocating said elongated member transversely of the longitudinal axis thereof and in a plane substantially parallel to said bottom, whereby to knead said mixture into a mass having a pasty consistency at the points where said mixture is forced from the container.

4. Apparatus for forming threads, filaments, and the like from a mixture of solid and liquid matter comprising in combination, a container for said mixture, said container having a perforated bottom therein, means for normally applying pressure to the top surface of said mixture to force the mixture through said perforations and out of the container, an elongated undulated member slightly spaced from said bottom, said member being constructed and arranged to reciprocate in a plane parallel to said bottom and across substantially all of said perforations, and means for reciprocating said elongated member transversely of the longitudinal axis thereof and in said plane, whereby to knead said mixture into a mass having a pasty consistency at the points where said mixture is forced from the container.

5. Apparatus as set forth in claim 1 in which said elongated member comprises a frame having a plurality of bars extending transversely thereof.

OTTO ROELEN.